United States Patent
Zhadan-Milligan et al.

(10) Patent No.: US 6,871,616 B2
(45) Date of Patent: Mar. 29, 2005

(54) PET UMBRELLA AND COMBINED PET LEASH AND UMBRELLA

(76) Inventors: Irina Zhadan-Milligan, P.O. Box 6412, New York, NY (US) 10150; Yuri Zhadan, P.O. Box 6412, New York, NY (US) 10150

(*) Notice: Subject to any disclaimer, the term of this patent is extended or adjusted under 35 U.S.C. 154(b) by 0 days.

(21) Appl. No.: 10/782,942

(22) Filed: Feb. 23, 2004

(65) Prior Publication Data

US 2004/0200437 A1 Oct. 14, 2004

Related U.S. Application Data

(60) Provisional application No. 60/449,451, filed on Feb. 24, 2003.

(51) Int. Cl.[7] ............................................. A01K 27/00
(52) U.S. Cl. .......................... 119/795; 119/769; 135/16
(58) Field of Search ................................ 119/795, 850, 119/769; 135/16, 20.1; D30/153, 151; 248/514

(56) References Cited

U.S. PATENT DOCUMENTS

| | | | | |
|---|---|---|---|---|
| 3,267,905 A | * | 8/1966 | Fleming | 119/795 |
| 4,537,339 A | | 8/1985 | Pearson | 224/188 |
| D324,117 S | | 2/1992 | Antoine | D30/144 |
| D324,943 S | | 3/1992 | Wu | D3/6 |
| D325,296 S | | 4/1992 | Wu | D3/6 |
| 5,546,970 A | | 8/1996 | Amato | 135/16 |
| 5,918,611 A | | 7/1999 | Amato | 135/16 |
| 2004/0134525 A1 | * | 7/2004 | Godshaw et al. | 135/16 |

FOREIGN PATENT DOCUMENTS

JP          09262038 A   * 10/1997   ......... A01K/27/00

OTHER PUBLICATIONS

Harriet Carter Catalog Code 35 2465 4245 date unknown p. 65.

* cited by examiner

Primary Examiner—Teri P. Luu
Assistant Examiner—Kimberly S Smith
(74) Attorney, Agent, or Firm—Nixon & Vanderhye

(57) ABSTRACT

A pet umbrella combines an umbrella and a leash. The umbrella includes a shaft carrying a canopy moveable between open and closed positions. In the open position, the convex side of the canopy faces the umbrella handle. A leash is secured to the opposite end of the shaft on the concave side of the canopy. The canopy is preferably oval in plan and formed of clear plastic see-through material. The major axis of the oval defined by the canopy forms a plane with the shaft whereby the shaft forms an included angle in the plane with the shaft of less than 90° and preferably about 30°–60°.

18 Claims, 5 Drawing Sheets

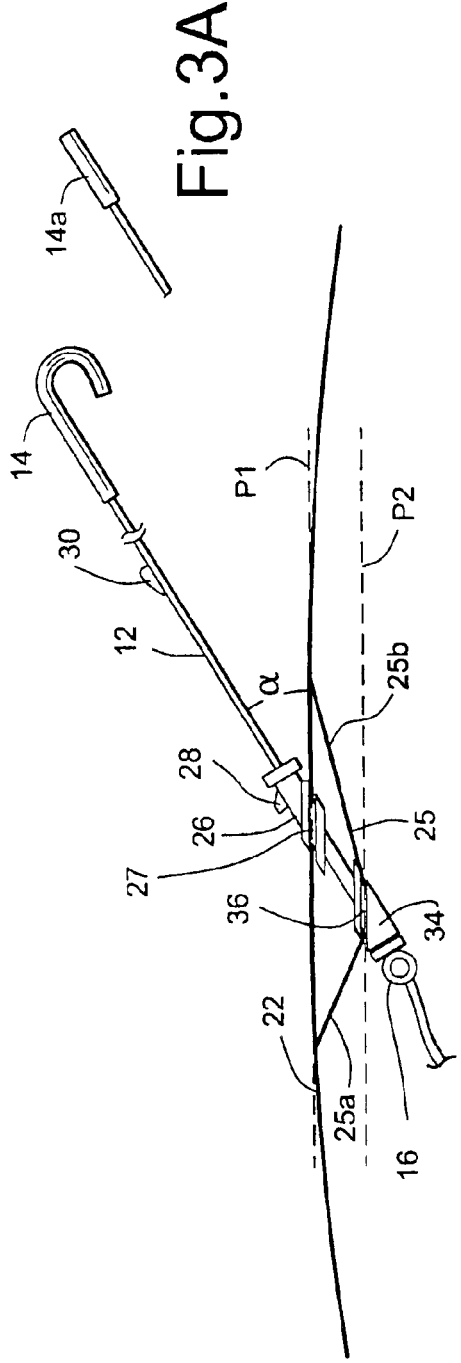
Fig.3
Fig.3A
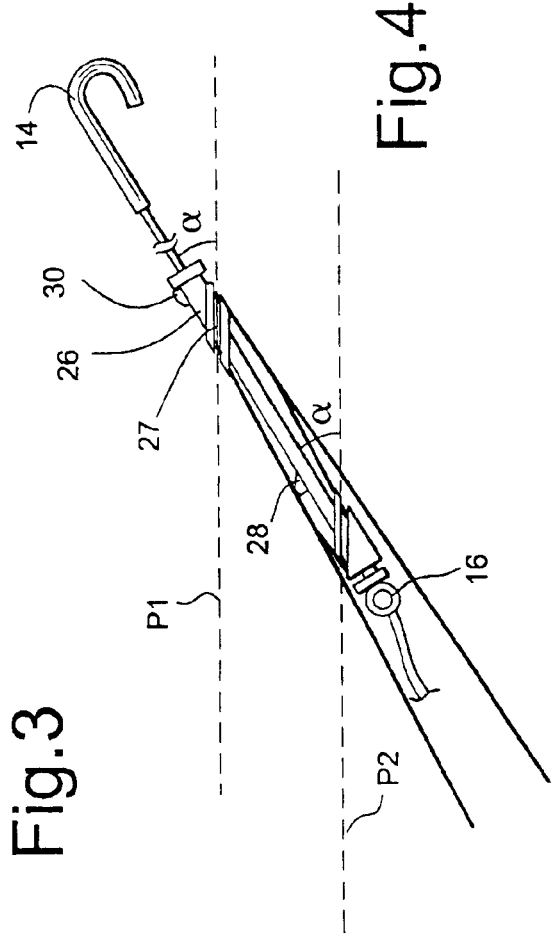
Fig.4

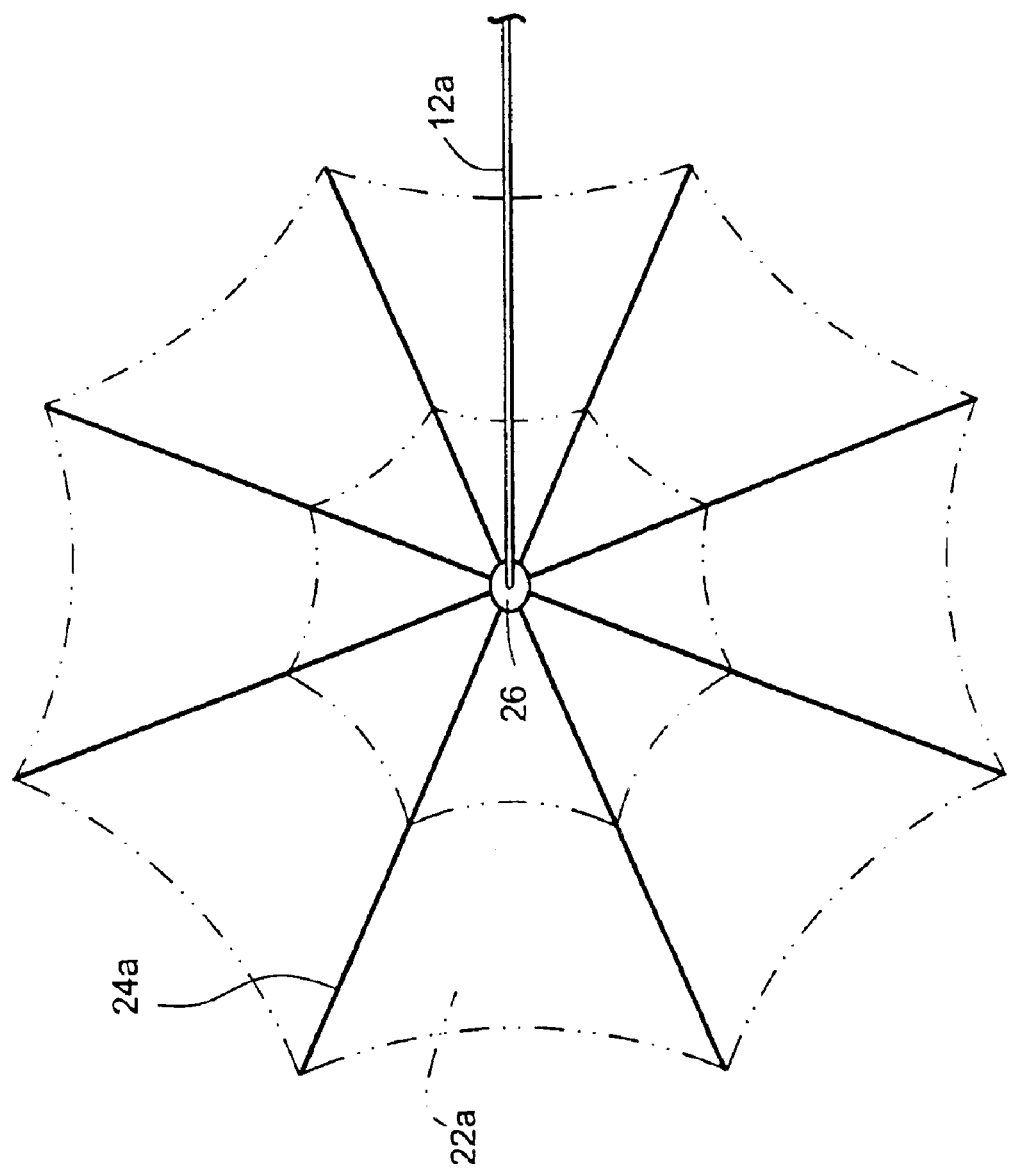

PET UMBRELLA AND COMBINED PET LEASH AND UMBRELLA

CROSS-REFERENCES TO RELATED APPLICATIONS

This application claims priority under 35 U.S.C. §119(e)(1) to provisional application Ser. No. 60/449,451 filed Feb. 24, 2003 by the inventors named herein, the entire subject matter of which provisional application is incorporated herein by reference.

BACKGROUND OF THE INVENTION

The present invention relates to an umbrella for a pet, such as a dog, and particularly relates to a combined pet leash and umbrella which in an open position of the umbrella canopy overlies the pet to protect the pet from inclement weather conditions while also serving as a leash for the pet in both umbrella canopy opened and closed positions.

While umbrellas have been conventionally provided individuals to protect them from inclement weather conditions, animals likewise require protection from inclement conditions, e.g. when they are being walked. Obviously the protection afforded by the protective envelope or spread of a conventional umbrella useful to protect individuals from inclement weather conditions is insufficient to protect the pet from such conditions. The pet obviously would walk beyond the envelope of protection afforded by the individual's umbrella.

Umbrellas for pets are per se not new and a number of umbrella type devices have been adapted to protect pets from inclement weather conditions. For example, U.S. Pat. Nos. 5,546,970 and 5,918,611 disclose umbrellas for pets which are secured to conventional pet harnesses and the pet collars. These umbrellas are independent of any leash for the pet whereby the individual may retain control of the pet. Also the movement of the pet relative to the harness, collar and/or umbrella as can be discerned from those patents may cause the umbrella to be skewed from its intended protective position overlying the pet to a partially unprotecting position. See also U.S. design patents D324,117; D324,943; and D325,296. It will be appreciated therefore that there is a need for an umbrella to protect a pet from inclement weather conditions and which umbrella is under control of the individual walking the pet as well as enabling the pet to be under control of the individual via the umbrella and a leash in both umbrella opened and closed positions.

BRIEF SUMMARY OF THE INVENTION

In accordance with a preferred aspect of the present invention, there is provided an umbrella having a shaft with a handle at one end and a coupling at an opposite end for securing a leash to the umbrella whereby the umbrella/leash combination are used to secure and control the pet. The canopy of the umbrella is carried by the shaft and is secured to a sleeve slidable along the shaft between canopy opened and canopy closed positions. In the canopy open position, the canopy has an upper generally convex surface facing the handle and a generally concave lower surface facing the coupling and the pet. The canopy in the open position is angularly related to the axis of the umbrella shaft whereby the canopy is generally horizontal in use while the shaft is inclined in use and toward the individual holding the umbrella/leash combination. Ribs interconnect the sleeve and margins of the canopy and a plurality of struts interconnect between the umbrella shaft and the ribs to support the canopy. While a circular canopy using ribs of equal length and struts of unequal length, an oval canopy in plan is preferred. In that embodiment both ribs of unequal length and struts of unequal length are employed. Thus the major axis of the oval shaped canopy extends in the same direction as the shaft maintaining the angular relation between the canopy and the shaft.

In a preferred aspect of the present invention, there is provided a combined pet leash and umbrella comprising a shaft having a handle at one end and a leash coupled to said shaft adjacent an opposite end thereof. A canopy is carried by said shaft and secured thereto by a sleeve slidable along the shaft between a canopy opened position and a canopy closed position, the canopy in the opened position having a generally convex surface facing the handle. A plurality of ribs are pivotally coupled at one end to the sleeve and to the canopy at opposite ends thereof adjacent margins of the canopy to support the canopy in the opened position. A plurality of struts is pivotally connected at one end to said shaft and pivotally connected at opposite ends to the ribs, the struts supporting the ribs in the canopy opened position. A detent is co-operable between the shaft and the hub for releasably maintaining the canopy in the opened position.

In a further aspect of the present inventions, there is provided an umbrella for a pet comprising a shaft having a handle at one end and a coupling adjacent an opposite end of the shaft enabling attachment of a pet leash. A canopy is carried by the shaft and secured thereto by a sleeve slidable along the shaft between a canopy opened position and a canopy closed position, the canopy in the opened position having a generally convex surface facing the handle and a generally concave lower surface facing the coupling. A plurality of ribs is pivotally coupled at opposite ends to the sleeve and the canopy, respectively. A plurality of struts is pivotally connected at opposite ends to the shaft and the ribs, respectively, and supporting the ribs and the canopy in the canopy opened position. A detent co-operable between the shaft and the sleeve for releasably maintaining the canopy in the opened position.

BRIEF DESCRIPTION OF THE DRAWINGS

FIG. 3 is a schematic illustration showing the opening and closing mechanism of the umbrella/leash with the canopy in the open position;

FIG. 3a is a fragmentary view illustrating a different type of handle for the umbrella/leash combination;

FIG. 4 is a schematic illustration similar to FIG. 3 illustrating the umbrella in a canopy closed position;

FIG. 6 is a schematic top plan view of a further embodiment hereof illustrating a circular umbrella.

DETAILED DESCRIPTION OF THE INVENTION

Figure 1:
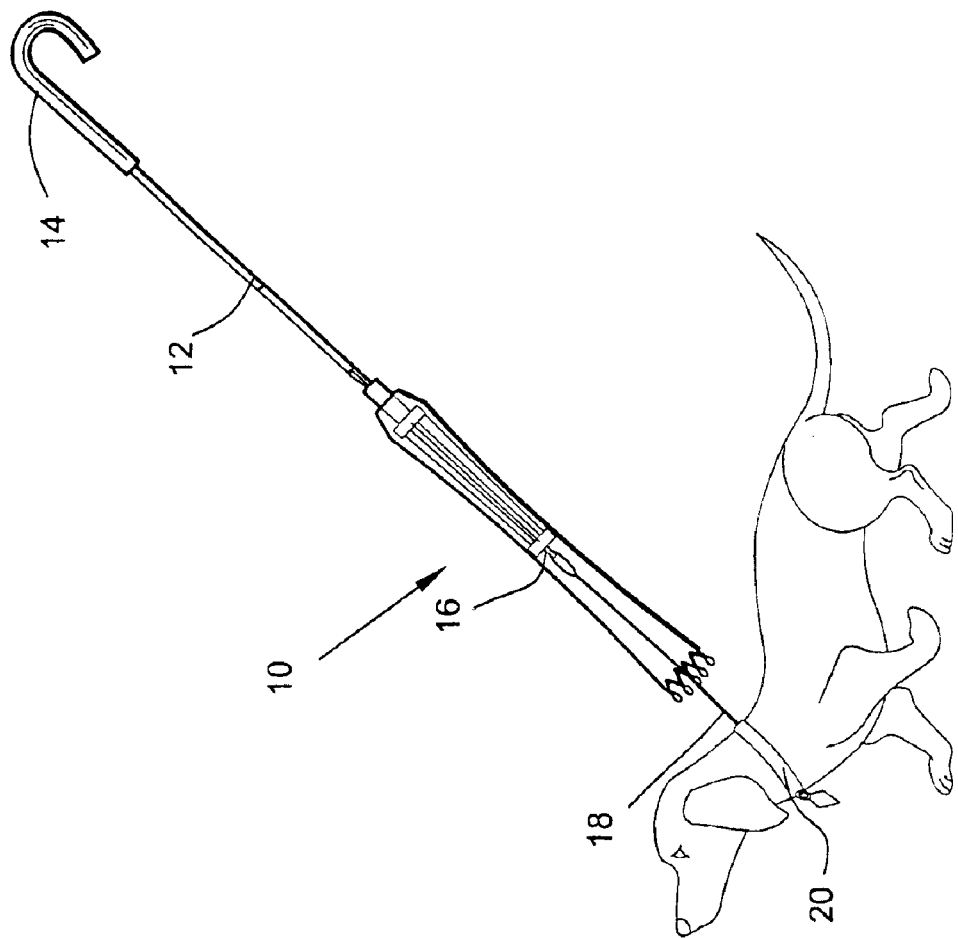
FIG. 1 is a schematic illustration of a combined leash and umbrella for a pet constructed in accordance with the preferred embodiment of the present invention.
Figure 2:
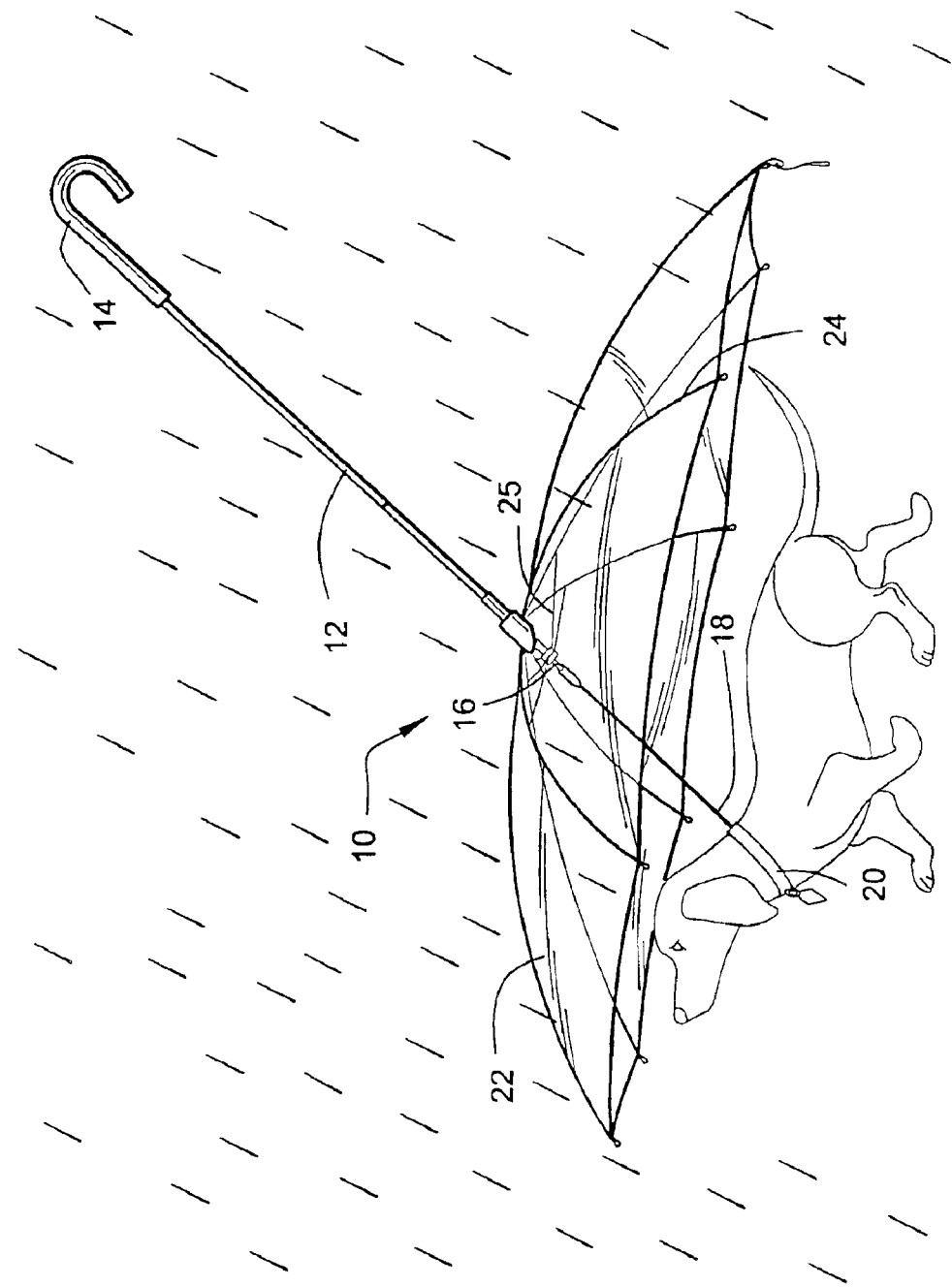
FIG. 2 is a view similar to FIG. 1 illustrating the umbrella in an open position protecting the pet from inclement weather conditions.
Figure 5:
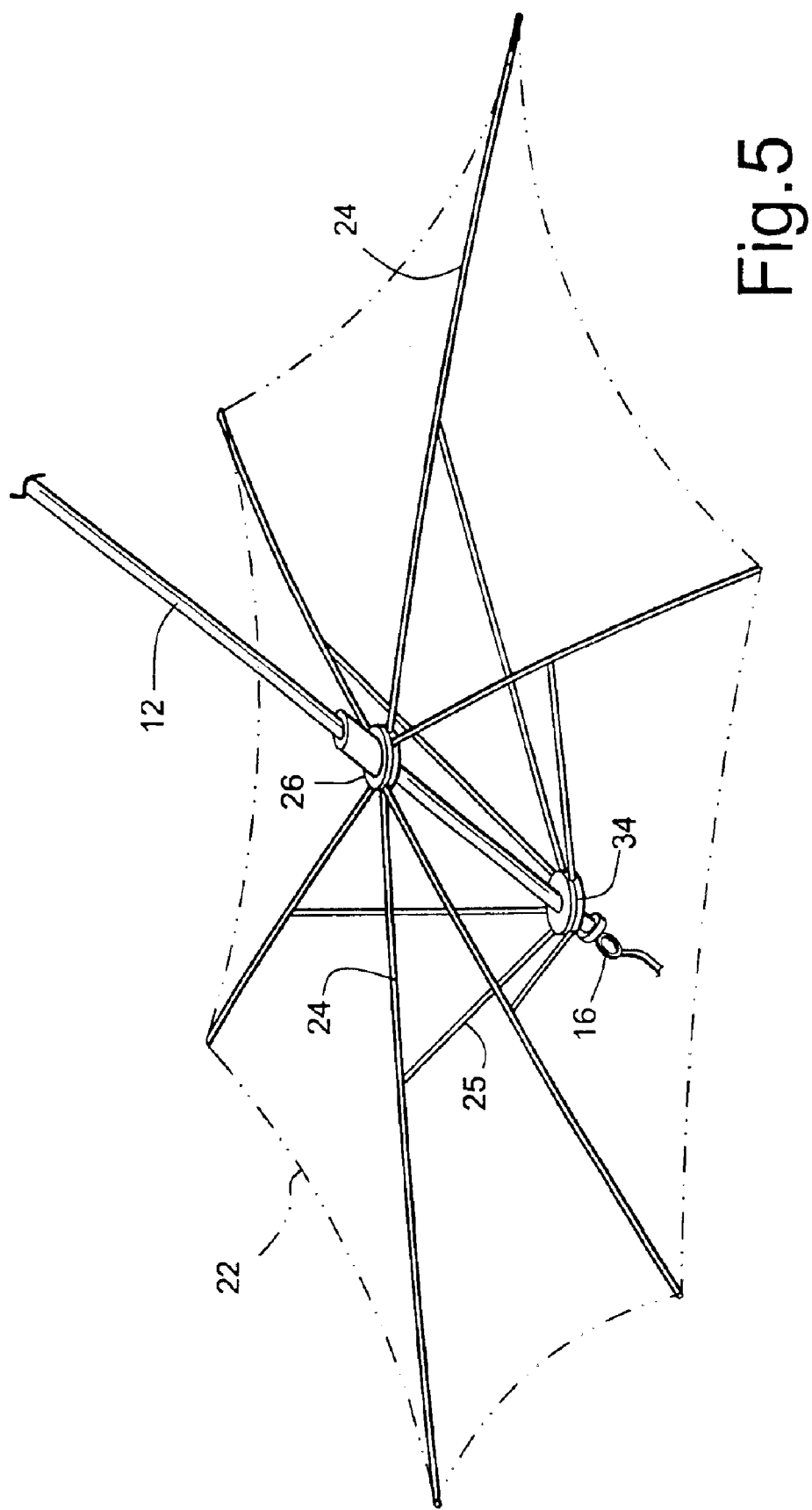
FIG. 5 is a perspective view of the umbrella/leash combination in an open position.

Referring now to the drawings, particularly to FIGS. 1 and 2, there is illustrated an umbrella/leash combination generally designated 10 with an umbrella canopy in closed and opened positions, respectively. The umbrella is mounted on a shaft 12 having a handle 14 at one end and a coupling 16 at its opposite end for connecting the umbrella with one end of a leash 18. It will be appreciated that leash 18 may be releasably secured to a collar 20 on the pet, in this instance a pet dog is illustrated.

In FIG. 2 the umbrella/leash combination is illustrated with the umbrella canopy 22 in an opened position overlying the pet. While the canopy in the opened position may be circular (as discussed hereafter), preferably the canopy is in a generally oval configuration in plan with the major axis of the oval configured canopy extending in a vertical plane also containing the shaft 12 and handle 14. From a review of FIGS. 1 and 2 it will be appreciated that the canopy 22 is supported by a plurality of ribs or spokes 24 which in turn are supported by a plurality of struts 25. Canopy 22 is also preferably formed of a clear plastic see-through material, preferably vinyl, although other materials including opaque materials can be used.

Referring now to FIGS. 3 and 4, the shaft 12 mounts a sleeve 26 slidable axially along the shaft 12 between detented canopy opened and closed positions illustrated in FIGS. 3 and 4, respectively. As illustrated in FIG. 3, the sleeve 26 is detented in the canopy opened position by a spring biased tab 28 carried by the shaft 12. Tab 28 is receivable in an opening or slot, not shown, through the sleeve 26 when the sleeve 26 is advanced to the canopy opened position. Another spring biased tab 30 is carried on the shaft 12 at a location adjacent the handle 14 and, in cooperation with sleeve 26, similarly serves to detent the sleeve 26 in the canopy closed position as illustrated in FIG. 4. The ribs 24 are pivotally mounted at proximal ends to sleeve 26. The opposite distal ends of ribs 24 are secured to margins of the canopy 22. Any suitable connection between the distal ends of the ribs 24 and the canopy 22 may be utilized and is well known in the art. As illustrated in FIGS. 3 and 4, the sleeve 26 has an annular recess 27 angled relative to shaft 12. Proximal ends of the ribs 22 are pivotally mounted to sleeve 26 in the annular recess 27 and slots are formed in the lower portion of the sleeve 26 to accommodate the pivoting movement of the ribs 22 when the umbrella is moved between canopy opened and canopy closed positions. While six ribs and six struts are illustrated in this preferred embodiment, it will be appreciated that a fewer or greater number of ribs and struts may be utilized to support the canopy.

Similarly, a hub 34 is mounted on shaft 12 at a location along the shaft 12 remote from the handle and on the opposite side of the sleeve 26 from the handle 14. Hub 34 is preferably fixed to the shaft but may be movable relative thereto. The hub 34 includes an annular recess 36 in which proximal ends of the struts 25 are pivotally mounted to the hub 34. Upper edge margins of the hub 34 have slots for receiving the struts 25 in the canopy closed position illustrated in FIG. 4. The opposite ends of struts 25 are of course pivotally connected to the ribs 22 intermediate opposite ends of the ribs. It will be appreciated that planes P1 and P2 passing through the annular recesses 27 and 36 of the movable sleeve 26 and hub 34, respectively, lie in parallel planes. Also it will be appreciated that the major axis of the oval shaped canopy lies in a vertical plane generally also including the shaft 12 and normal to planes ρ1 and ρ2. Thus the shaft 12 and the planes P1 and P2 passing through sleeve 26 and hub 34 in the recesses 27 and 36 form an included angle α in the vertical plane containing the major axis of the canopy 22. The angle α preferably lies in a range of about 30°–60°. It will also be appreciated that the minor axis of the oval shaped canopy extends perpendicular to the major axis and passes perpendicularly through the vertical plane containing the shaft 12 and the major axis of the oval shaped canopy. The handle 14 and coupling 16 for the leash lie on respective opposite sides of the minor axis.

Also, as illustrated in FIG. 3a, the handle 14 may comprise a straight handle 14a as compared with the arcuate handle 14 illustrated in FIG. 3. Additionally, the sleeve 26 may have a non-circular interior opening complementary to the shaft, or maybe be slidably detented to the shaft to prevent the canopy from twisting relative to the shaft.

From a review of the drawing figures, it will be appreciated that the ribs 24 defining the generally oval shaped canopy are symmetrical about the major axis. Ribs 24 along opposite sides of the canopy are, however, different in length as compared to the ribs 24 extending along the major axis of the oval shaped canopy. Likewise, the struts 25 are symmetrical about the major axis. Struts 25 along the opposite sides of the canopy are, however, different in length as compared with the struts parallel to the major axis. Further, as illustrated in FIG. 3, the strut 25a between hub 34 and the rib 24 forwardly of the minor axis is shorter than the strut 25b extending between hub 34 and the rearwardly extending rib 24 on the opposite side of the minor axis. Thus, the struts paralleling the major axis of the oval shaped canopy 22 and on opposite sides of the minor axis are unequal in length relative to one another.

In use, the leash 18 is attached to the pet collar 20 and also to the distal end of the umbrella i.e., to the coupling 16. Any suitable connection may be used. In the canopy closed position, the shaft 12 serves as part of the leash for the pet. To open the umbrella during inclement weather conditions, detent 30 is depressed enabling the sleeve 26 to be manually displaced along shaft 12 in a direction away from the handle 14 and toward the coupling 16. Upon the sleeve 26 obtaining a position along the shaft in registration with tab 28, the tab is biased outwardly into the slot formed on the sleeve 26 to maintain the sleeve in position along the shaft with the canopy extended in the canopy opened position as illustrated in FIG. 3. It will be appreciated that the different lengths of the ribs 24 and the struts 26 enable the canopy 22 to open into a generally oval configuration in plan. Additionally, it will be appreciated that in the canopy opened position, a vertical plane passing through the major axis also contains the shaft 12. The included angle between the shaft 12 and the planes P1 and P2 preferably lies in a range of approximately 35°–60°. Thus the canopy extends forwardly from the individual holding the handle 14, lies in a generally horizontal position and extends lengthwise from the individual. When it is desired to close the canopy 22, the tab 28 is depressed releasing the sleeve 26 for manual sliding movement in a direction toward the handle where it is once again detented by the tab 30 in the canopy closed position.

Referring now to FIG. 6, there is illustrated a further embodiment of the combined umbrella/leash hereof with a canopy having a generally circular configuration. In this form, the shaft 12a connects to the movable sleeve 26a at the apex of the circular canopy 22a. The shaft 12a extends below the canopy to a fixed hub similarly as in the previous embodiment to which the struts are pivotally connected. In this form, the ribs 24a supporting the canopy 22a are of equal length while the struts supporting the canopy are of unequal length. This enables the circular canopy to lie in a generally horizontal orientation when in the canopy opened position with the shaft 12a being inclined relative to the canopy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combined pet leash and umbrella comprising:
   a shaft having a handle at one end and a leash coupled to said shaft adjacent an opposite end thereof;
   a canopy carried by said shaft and secured thereto by a sleeve slidable along the shaft between a canopy opened position and a canopy closed position;
   said canopy in the opened position having a generally convex surface facing the handle;
   a plurality of ribs pivotally coupled at one end to said sleeve and at opposite ends to said canopy adjacent margins thereof to support said canopy in the open position;
   a plurality of struts pivotally connected at one end to said shaft and pivotally connected at opposite ends to said ribs;
   the struts supporting said ribs in said canopy opened position; and
   a detent co-operable between said shaft and said hub for releasably maintaining said canopy in the opened position, wherein said canopy in the opened position has portions adjacent said sleeve lying generally in a horizontal plane, said shaft intersecting said plane at an angle different than 90°.

2. A combined pet leash and umbrella according to claim 1 wherein said canopy in the opened position circumscribes in plan a generally oval shape.

3. A combined pet leash and umbrella according to claim 1 wherein at least a pair of said ribs are unequal in length relative to one another.

4. A combined pet leash and umbrella according to claim 1 wherein at least a pair of said struts are unequal in length relative to one another.

5. A combined pet leash and umbrella according to claim 1 wherein said canopy in the opened position has a generally oval shape having major and minor axes, said shaft and said major axis lying generally in a common plane and wherein the shaft and the major axis form an included angle in said plane in a range of about 30°–60°.

6. A combined pet leash and umbrella according to claim 1 wherein said canopy in the opened position has a generally oval configuration in plan having major and minor axes, said shaft and said major axis lying generally in a common plane with said handle spaced on one side of the minor axis and said opposite end of said shaft lying on an opposite side of said minor axis.

7. A combined pet leash and umbrella according to claim 1 wherein said pivotal connections between said sleeve and said ribs lie in a plane passing through said shaft and wherein said shaft and said plane lie in non-perpendicular relation to one another.

8. A combined pet leash and umbrella according to claim 1 wherein said pivotal connections between said shaft and said struts lie in a plane passing through said shaft and wherein said shaft and said plane lie in non-perpendicular relation to one another.

9. A combined pet leash and umbrella according to claim 1 wherein said pivotal connections between said sleeve and said ribs lie in a first plane passing through said shaft, said pivotal connections between said shaft and said struts lying in a second plane passing through said shaft, said first and second planes lying generally parallel to one another, said shaft and said first and second planes lying in non-perpendicular relation to one another.

10. A combined pet leash and umbrella according to claim 9 wherein at least a pair of said ribs are unequal in length relative to one another, at least a pair of said struts are unequal in length relative to one another, said canopy in the open position having a generally oval shape with major and minor axes, said shaft and said major axes lying generally in a common plane and wherein the shaft and the major axis form an included angle in said common plane less than 90°.

11. A combined pet leash and umbrella according to claim 1 wherein said canopy is formed of a clear plastic material.

12. An umbrella for a pet comprising
   a shaft having a handle at one end and a coupling adjacent an opposite end of said shaft enabling attachment of a pet leash;
   a canopy carried by said shaft and secured thereto by a sleeve slidable along the shaft between a canopy opened position and a canopy closed position;
   said canopy in the opened position having an upper generally convex surface facing the handle and a lower generally concave surface facing the coupling;
   a plurality of ribs pivotally coupled at opposite ends to said sleeve and said canopy, respectively;
   a plurality of struts pivotally connected at opposite ends to said shaft and said ribs, respectively, and supporting said ribs and said canopy in said canopy opened position; and
   a detent co-operable between said shaft and said sleeve for releasably maintaining said canopy in the opened position, wherein said canopy in the opened position has portions adjacent said sleeve lying generally in a horizontal plane, said shaft intersecting said plane at an angle different than 90°.

13. An umbrella according to claim 12 wherein said canopy in the opened position has a generally oval shape in plan.

14. An umbrella according to claim 12 wherein at least a pair of said ribs are unequal in length relative to one another.

15. An umbrella according to claim 12 wherein at least a pair of said struts are unequal in length relative to one another.

16. An umbrella according to claim 12 wherein said canopy in the opened position has a generally oval shape having major and minor axes, said shaft and said major axis lying generally in a common plane wherein the shaft and the major axis form an included angle in said plane in a range of about 30°–60°.

17. An umbrella according to claim 12 wherein said canopy in the opened position has a generally oval configuration in plan having major and minor axes, said shaft and said major axis lying generally in a common plane with said handle spaced on one side of the minor axis and said opposite end of said shaft lying on an opposite side of said minor axis.

18. An umbrella according to claim 12 wherein said canopy has a generally circular configuration in plan.

* * * * *